(12) United States Patent
Lovett et al.

(10) Patent No.: US 7,467,506 B2
(45) Date of Patent: Dec. 23, 2008

(54) LOCKOUT FOR FLOAT ARMS IN A CUTTING PLATFORM OF AN AGRICULTURAL HARVESTING MACHINE

(75) Inventors: Benjamin Max Lovett, Colona, IL (US); Bruce Alan Coers, Hillsdale, IL (US)

(73) Assignee: Deere & Company, Moline, IL (US)

( * ) Notice: Subject to any disclaimer, the term of this patent is extended or adjusted under 35 U.S.C. 154(b) by 167 days.

(21) Appl. No.: 11/366,066

(22) Filed: Mar. 2, 2006

(65) Prior Publication Data
US 2007/0204585 A1  Sep. 6, 2007

(51) Int. Cl.
*A01D 34/00* (2006.01)
(52) U.S. Cl. ...................................... 56/15.8
(58) Field of Classification Search ............... 56/10.2 E, 56/10.2 D, 10.2 F, 10.2 R, DIG. 15, 208
See application file for complete search history.

(56) References Cited

U.S. PATENT DOCUMENTS

| | | | |
|---|---|---|---|
| 3,953,959 A * | 5/1976 | Decruyenaere | 56/208 |
| 4,196,917 A * | 4/1980 | Oakes et al. | 280/463 |
| 4,776,153 A * | 10/1988 | DePauw et al. | 56/10.2 E |
| 4,845,931 A * | 7/1989 | Bruner et al. | 56/208 |
| 5,535,578 A * | 7/1996 | Honey | 56/14.9 |
| 5,983,615 A * | 11/1999 | Schmid et al. | 56/208 |
| 6,151,874 A * | 11/2000 | Eis | 56/10.2 E |
| 6,619,020 B1 * | 9/2003 | Chaney et al. | 56/10.9 |
| 6,675,568 B2 * | 1/2004 | Patterson et al. | 56/208 |
| 6,813,873 B2 * | 11/2004 | Allworden et al. | 56/10.2 E |
| 6,901,729 B1 * | 6/2005 | Otto et al. | 56/208 |
| 7,168,226 B2 * | 1/2007 | McLean et al. | 56/10.2 E |
| 7,191,582 B2 * | 3/2007 | Bomleny | 56/10.2 E |
| 7,207,164 B2 * | 4/2007 | Bomleny | 56/10.2 E |
| 7,222,475 B2 * | 5/2007 | Bomleny et al. | 56/10.2 E |
| 7,277,785 B2 * | 10/2007 | Strosser et al. | 701/50 |
| 2007/0193243 A1 | 8/2007 | Schmidt et al. | |

* cited by examiner

*Primary Examiner*—Árpád Fábián-Kovács

(57) ABSTRACT

An agricultural harvesting machine includes a feeder housing and a cutting platform attached to the feeder housing. The cutting platform includes a frame, an accumulator carried by the frame, a plurality of float arms movably coupled with the frame, and a plurality of float cylinders. Each float cylinder is coupled between the frame and a respective float arm. A shut-off valve is fluidly connected between the accumulator and at least one float cylinder.

16 Claims, 4 Drawing Sheets

LOCKOUT FOR FLOAT ARMS IN A CUTTING PLATFORM OF AN AGRICULTURAL HARVESTING MACHINE

FIELD OF THE INVENTION

The present invention relates to agricultural harvesting machines, such as combines, and, more particularly to cutting platforms for such combines.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

Periodically it is necessary to raise the cutting platform during harvesting operation, such as when turning around at the end of a field. With a rigid frame platform as described above, the cutterbar remains substantially in a same position as when in a float position, and cut crop material is moved by the reel onto the belt for conveying to the feeder housing.

What is needed in the art is a draper platform which better follows the ground contour during operation, while adequately retaining crop material on the cutting platform when raising of the cutting platform is initiated during a float mode.

SUMMARY OF THE INVENTION

The invention comprises, in one form thereof, an agricultural harvesting machine, including a feeder housing and a cutting platform attached to the feeder housing. The cutting platform includes a frame, an accumulator carried by the frame, a plurality of float arms movably coupled with the frame, and a plurality of float cylinders. Each float cylinder is coupled between the frame and a respective float arm. A shut-off valve is fluidly connected between the accumulator and at least one float cylinder.

The invention comprises, in another form thereof, a method of operating an agricultural harvesting machine, including the steps of: moving a cutting platform to an operating position; placing the cutting platform in a float position, whereby a plurality of float arms carrying at least one cutterbar freely pivot relative to a frame; initiating a raise movement of the cutting platform; and locking the plurality of float arms in a current float position upon initiation of the raise movement.

DETAILED DESCRIPTION OF THE INVENTION

Figure 1:
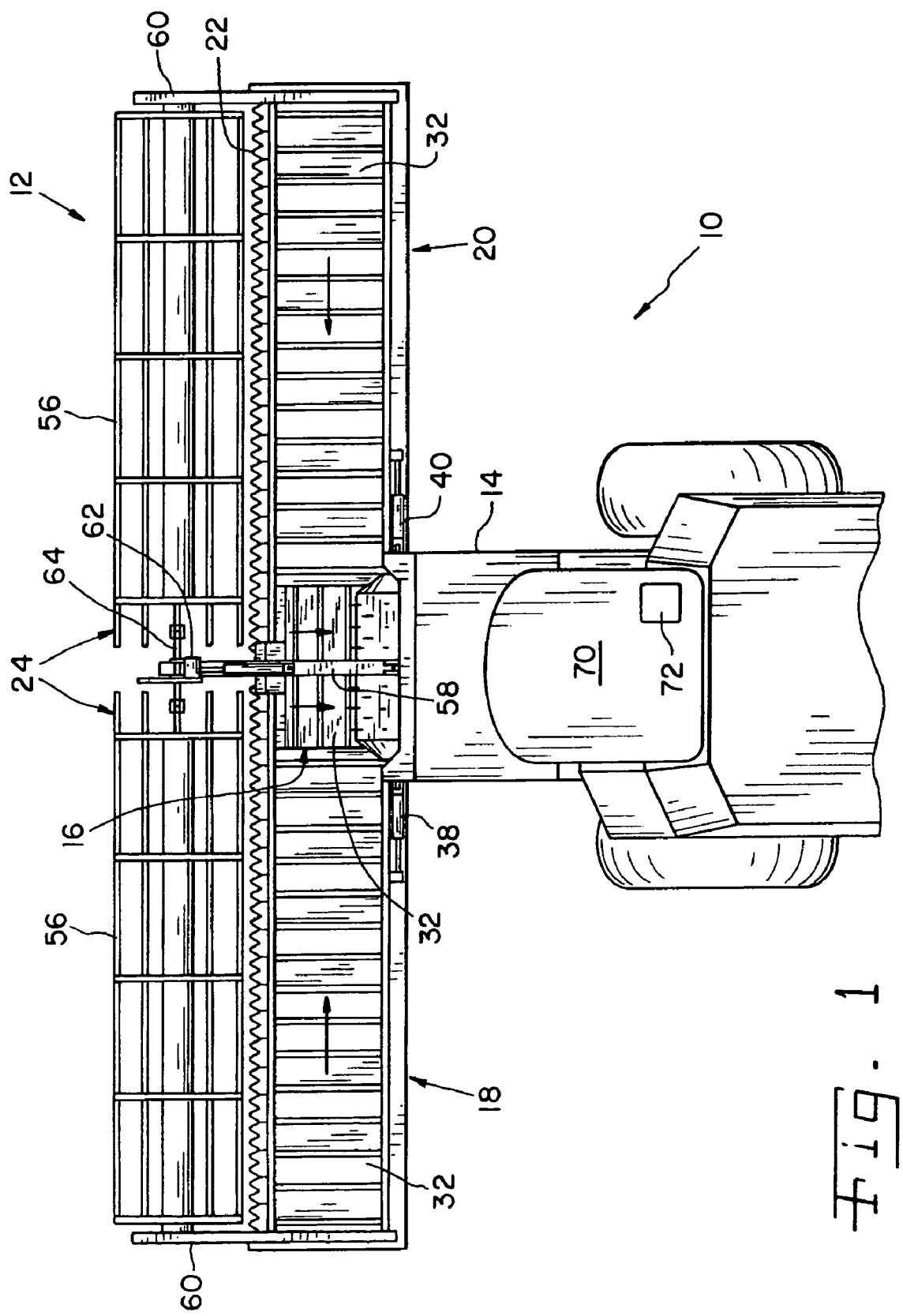
FIG. 1 is a fragmentary, top view of an agricultural combine including an embodiment of a draper platform of the present invention.
Figure 2:
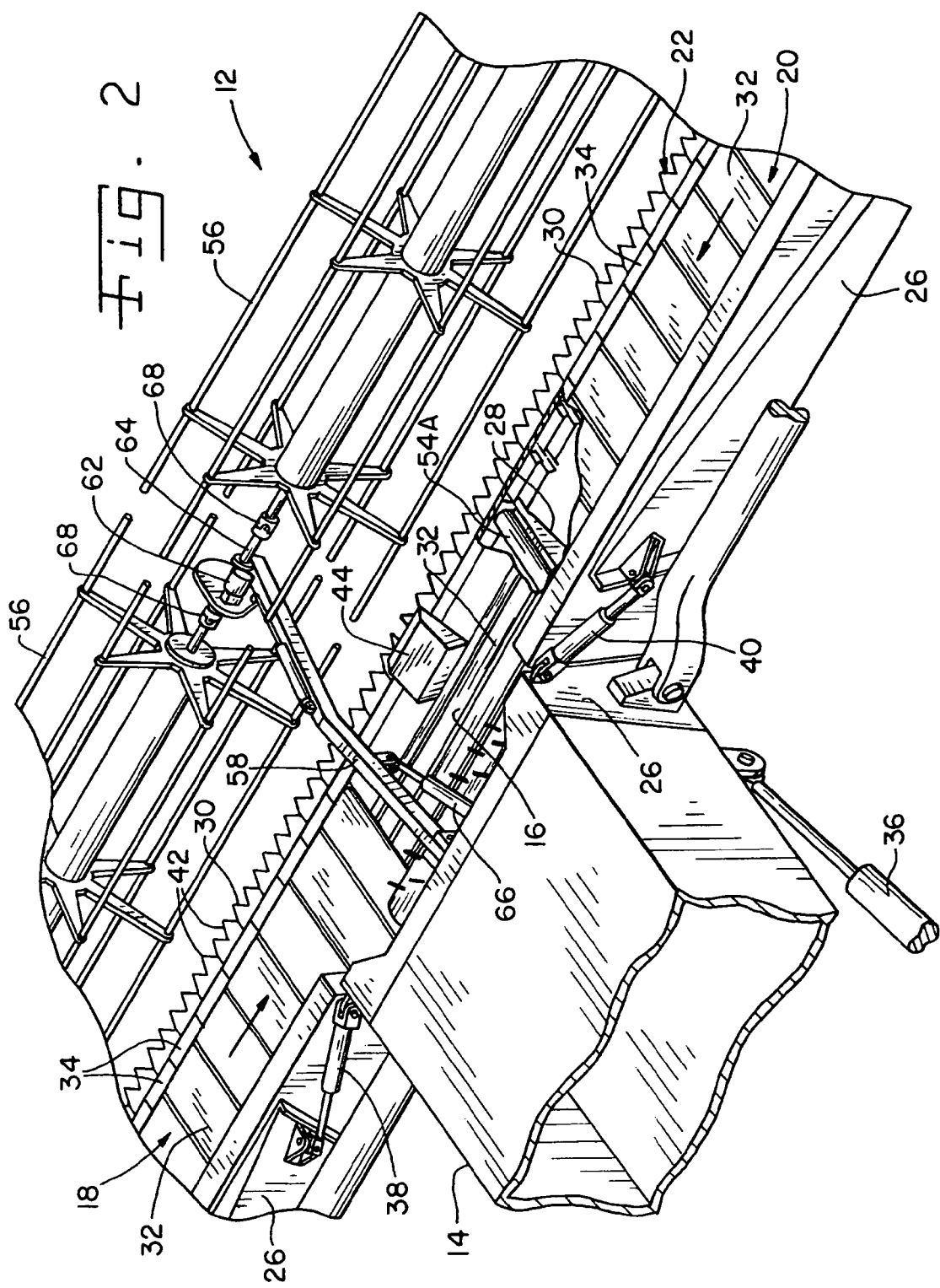
FIG. 2 is a fragmentary, perspective view of the agricultural combine of FIG. 1.

Referring now to the drawings, and, more particularly to FIGS. 1 and 2, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a single blade knife (as shown) or a double blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Figure 3:
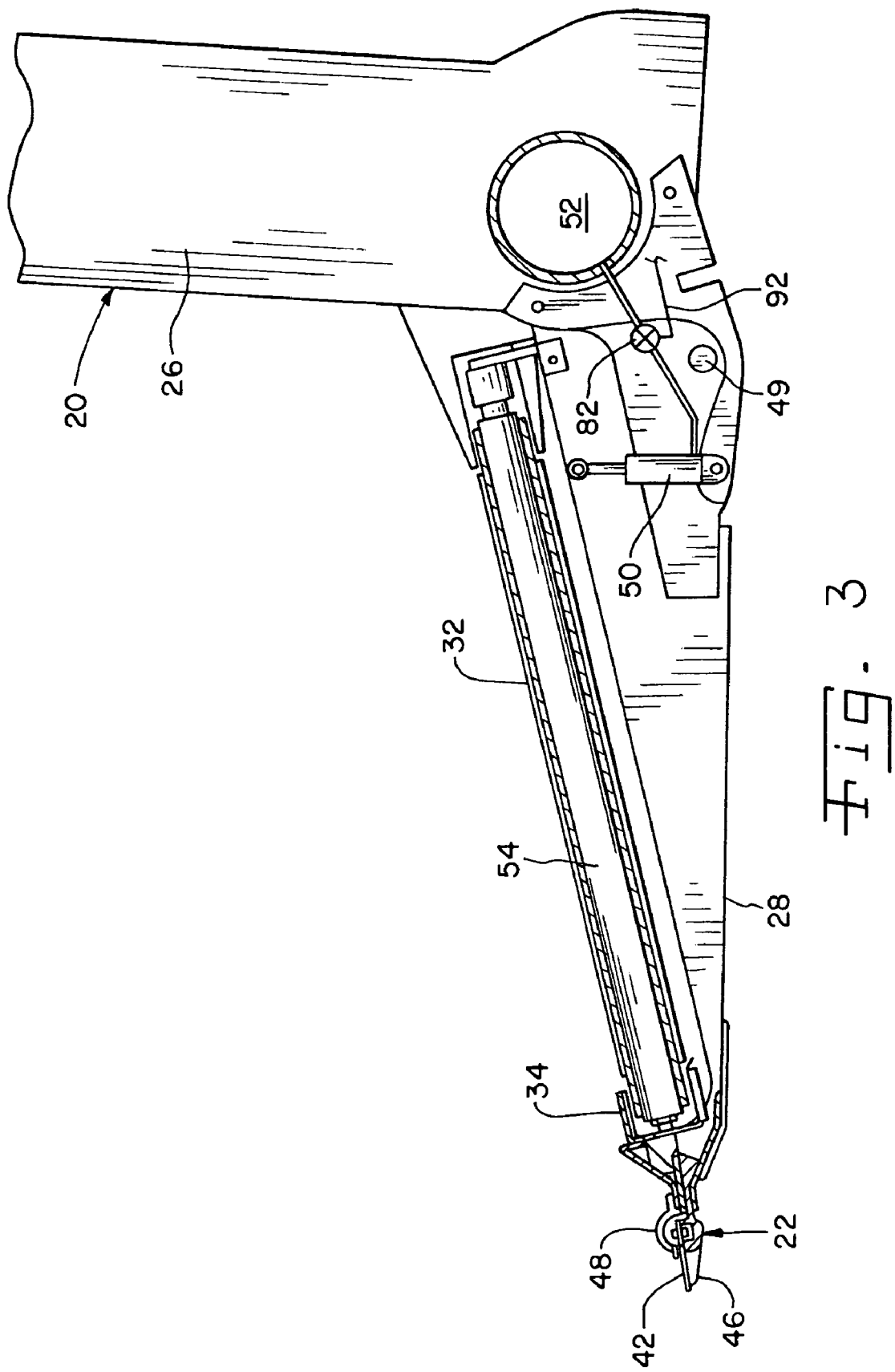
FIG. 3 is a side, sectional view through a wing platform section shown in FIGS. 1 and 2.

Referring to FIGS. 2 and 3, float arms 28 may be pivoted at their connection locations (pin 49) with a respective frame 26. A float cylinder 50 coupled between a respective frame 26 and float arm 28 may be used for raising or lowering the outboard end of float arm(s) 28 at the leading edge of cutting platform 12. Each float cylinder 50 may also be placed in a "float" position allowing the connected float arm 28 to generally follow the ground contour during operation. More particularly, each float cylinder 50 is fluidly connected with an accumulator 52 carried by a platform section 16, 18 or 20. In the embodiment shown, second wing platform section 20 is assumed to carry accumulator 52. However, accumulator 52 can be carried by first wing platform section 18, or multiple accumulators could be provided. Accumulator 52 allows fluid to flow to and from attached float cylinders 50 such that no pressure build-up occurs when in a float state. In this manner, the rams associated with each float cylinder 50 are free to move back and forth longitudinally, thereby allowing float arms 28 to follow the ground contour. When not in a float mode, float cylinders 50 can be actuated to move float arms 28 in an upward or downward direction. In the embodiment shown, each float cylinder 50 is a hydraulic cylinder, but could possibly be configured as a gas cylinder for a particular application.

Each float arm 28 is also associated with a respective roller 54. The plurality of rollers 54 for each platform section 16, 18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Figure 4:
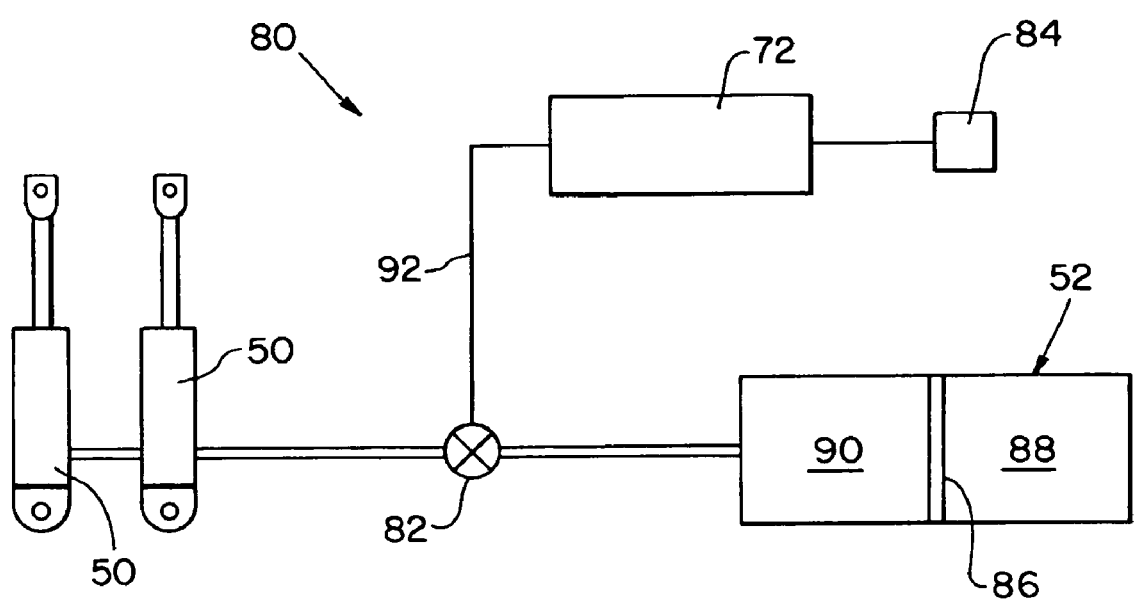
FIG. 4 is a schematic illustration of an embodiment of the hydraulic lockout system of the present invention.

Referring now to FIGS. 3 and 4, an embodiment of a hydraulic lockout system 80 of the present invention will be described in greater detail. Hydraulic lockout system 80 generally includes accumulator 52, controller 72 and a plurality of float cylinders 50 as described above. Only two float cylinders 50 are shown for simplicity sake. Additionally, hydraulic lockout system 80 includes a shut-off valve 82 and an actuator 84 which will be described in more detail hereinafter.

Shut-off valve 82 fluidly interconnects accumulator 52 with a plurality of float cylinders 50 associated with each respective float arm 28. In the embodiment shown, float cylinders 50 are coupled together in a series manner, but may also be coupled together in a parallel or combination of series and parallel manner, depending upon the application. Additionally, the plurality of float cylinders 50 are shown in FIG. 4 as being coupled with a single accumulator 52 carried by second wing platform section 20, but could also be fluidly coupled with different accumulators, or with multiple accumulators coupled together in series.

Accumulator 52 is a piston-type accumulator including a piston 86 separating a gas chamber 88 from an oil chamber 90. The volume of gas chamber 88 and oil chamber 90 of course can vary, depending upon the longitudinal position of piston 86 within accumulator 52. Oil within oil chamber 90 flows to and from float cylinders 50. The gas within gas chamber 88 is pressurized to a predetermined pressure and acts as a spring opposite the oil within oil chamber 90. Accumulator 52 can also be configured as a different type of accumulator, such as a bladder-type accumulator.

Each float cylinder 50 is shown as a one-way cylinder, in which pressurized fluid is used to extend the ram from each float cylinder 50, and the weight of platform sections 16, 18 and 20 is used to retract the ram within each float cylinder 50 in an unpressurized state.

Controller 72, typically located within cab 70 of combine 10, controllably actuates shut-off valve 82. In one form, shut-off valve 82 is an electric solenoid valve which may be opened and closed under the control of controller 72. Controller 72 is also electrically coupled with actuator 84 which signals initiation of a lift operation for the entire cutting platform 12 carried by combine 10. Conventionally, initiation of actuator 84 causes actuation of lift cylinder 36, resulting in lifting of cutting platform 12. Actuator 84 preferably is in the form of an electric switch, but may also be configured as an electric or hydraulic lever for actuating lift cylinder 36.

According to an aspect of the present invention, actuation of switch 84 also causes controller 72 to transmit a signal via line 92 resulting in closing of shut-off valve 82. In this manner, the oil which is at that time within each float cylinder 50 cannot flow back toward accumulator 52, and the position of the ram associated with each float cylinder 50 is locked in place.

During harvesting operation, cutting platform 12 is placed in a "float" position as combine 10 traverses across the ground. Typically, a field is opened by making several rounds around the periphery of the field. Combine 10 is then moved back and forth across the field, with the combine being shifted approximately the width of cutting platform 12 for each pass across the field. At opposite ends of the field, the cutting platform 12 is raised while the combine is being turned around for the next pass. As cutter bar 30 clears the crop material at the end of the field, electric switch 84 is depressed by an operator which initiates a lifting operation of cutting platform 12 using lift cylinder 36. Upon initiation of electric switch 84, controller 72 also closes shut-off valve 82 locking float cylinders 50 in place. This prevents platform sections 16, 18 and 20 from falling to the "bottomed out" position, thereby inhibiting the crop material from falling off during the lifting operation.

Absent use of the hydraulic lockout system of the present invention, cutting platform 12 remains in the "float" position when the lifting operation is initiated using electric switch 84. Since the hydraulic oil within float cylinders 50 would be free to flow back to accumulator 52, each float arm 28, and endless belts 32 carried thereby, would pivot to the downward most position in which the platform sections 16, 18 and 20 are bottomed out. This results in the angle of cutterbar assembly 22 and endless belts 32 being at a steeper pitch relative to the ground surface, which may result in some of the crop material falling off of the leading edge of cutter bar assembly 22. The hydraulic lockout system 80 of the present invention inhibits drop off of crop material from the leading edge of cutterbar assembly 22, which of course is desirable. Further, the hydraulic lockout system allows the angular approach or offset of the skid shoes beneath the cutting platform to be lessened, which in turn inhibits the cutterbar assembly from harpooning into the ground when the cutting platform is lowered to an operating position.

The hydraulic lockout system of the present invention is shown and described above for use with a draper cutting platform having a flexible cutterbar assembly. It is also to be understood that the hydraulic lockout system of the present invention can be used with a different type of cutting platform having a flexible cutterbar assembly, such as a cutting platform using a dual feed auger at the rear of the cutting platform, rather than draper belts.

Having described the preferred embodiment, it will become apparent that various modifications can be made without departing from the scope of the invention as defined in the accompanying claims.

The invention claimed is:

1. An agricultural harvesting machine, comprising:
   a feeder housing;
   a lift cylinder coupled with said feeder housing;
   an actuator for actuating said lift cylinder;
   a cutting platform attached to said feeder housing, said cutting platform including a frame, an accumulator carried by said frame, a plurality of float arms movably coupled with said frame, a plurality of float cylinders, each said float cylinder coupled between said frame and a respective said float arm, and a shut-off valve fluidly connected between said accumulator and at least one said float cylinder; and
   an electronic controller coupled with each of said actuator and said shut-off valve, said controller closing said shut-off valve upon initiation of said actuator.

2. The agricultural harvesting machine of claim 1, wherein said shut-off valve comprises an electric solenoid valve.

3. The agricultural harvesting machine of claim 1, wherein said actuator comprises one of a switch and a lever.

4. The agricultural harvesting machine of claim 1, wherein said shut-off valve is fluidly connected with a plurality of said float cylinders.

5. The agricultural harvesting machine of claim 1, wherein said cutting platform includes a plurality of platform sections, said frame comprises one of a plurality of frames, and each said platform section includes a corresponding one of said plurality of frames.

6. The agricultural harvesting machine of claim 5, wherein said accumulator comprises one of a plurality of accumulators, each said accumulator carried by a respective said frame of a respective said platform section.

7. The agricultural harvesting machine of claim 1, wherein each said float arm includes a roller.

8. The agricultural harvesting machine of claim 1, wherein each said float arm is pivotally coupled with said frame.

9. A cutting platform for use with an agricultural harvesting machine, the harvesting machine including a feeder housing, a lift cylinder coupled with the feeder housing, and an operator actuated actuator for lifting the feeder housing using the lift cylinder, said cutting platform comprising:
   a frame;
   a plurality of float arms movably coupled with said frame;
   a plurality of float cylinders, each said float cylinder coupled between said frame and a respective said float arm;
   an accumulator;
   a shut-off valve fluidly connected between said accumulator and at least one said float cylinder, said shut-off valve automatically closing upon initiation of the actuator by an operator.

10. The cutting platform of claim 9, wherein said shut-off valve comprises an electric solenoid valve.

11. The agricultural harvesting machine of claim 9, wherein said shut-off valve is fluidly connected with a plurality of said float cylinders.

12. The agricultural harvesting machine of claim 9, wherein said cutting platform includes a plurality of platform sections, said frame comprises one of a plurality of frames, and each said platform section includes a corresponding one of said plurality of frames.

13. The agricultural harvesting machine of claim 12, wherein said accumulator comprises one of a plurality of accumulators, each said accumulator carried by a respective said frame of a respective said platform section.

14. The agricultural harvesting machine of claim 9, wherein each said float arm includes a roller.

15. The agricultural harvesting machine of claim 9, wherein each said float arm is pivotally coupled with said frame.

16. The agricultural harvesting machine of claim 9, wherein said accumulator is carried by said frame.

* * * * *